June 13, 1939.  P. R. LEE  2,162,485
MANUAL RESET THERMOSTAT
Filed June 26, 1937
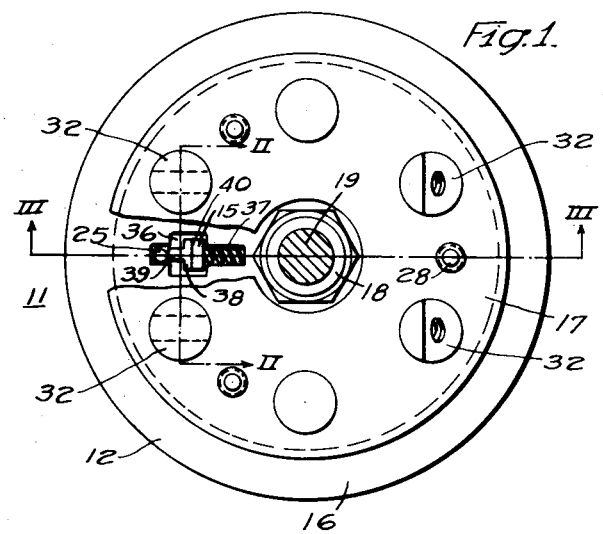
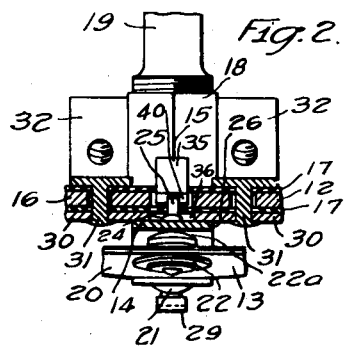
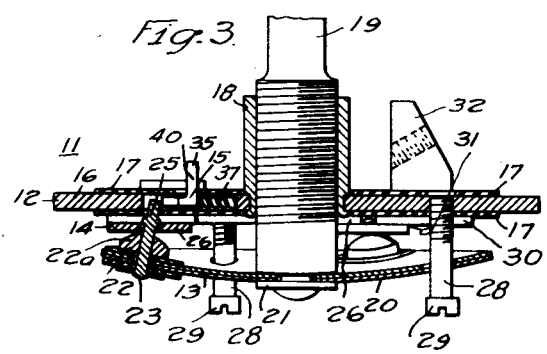
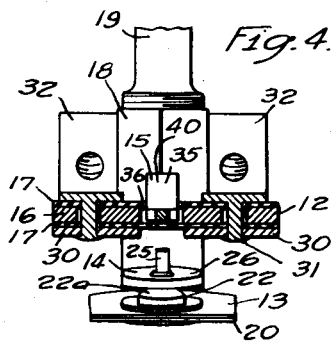
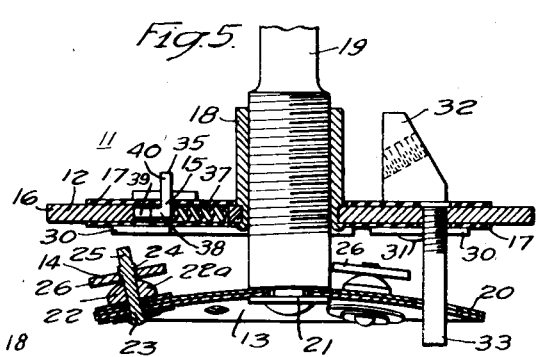
WITNESSES:
INVENTOR
Paul R. Lee.
BY
W. R. Coley
ATTORNEY Patented June 13, 1939

2,162,485

UNITED STATES PATENT OFFICE 2,162,485

MANUAL RESET THERMOSTAT

Paul R. Lee, Mansfield, Ohio, assignor to Westinghouse Electric & Manufacturing Company, East Pittsburgh, Pa., a corporation of Pennsylvania Application June 26, 1937, Serial No. 150,502

4 Claims. (Cl. 200—138)

My invention relates to thermostats and more particularly to manually resetting bimetallic thermostats.

With those manually resetting disc-type thermostats known to the art, it has been necessary to bodily move the bimetallic member in order to reset such devices. The necessity of having some structure to bodily move the bimetallic member of the thermostat to reset such thermostat has resulted in thermostats which are large and bulky which, in turn, limits their use and adaptability. A further objection to those manually resetting thermostats known to the art is that the resetting mechanism may cause the circuit-maker and breaker associated with the bimetallic member to be closed regardless of the ambient temperature which operates such bimetallic members.

It is therefore an object of my invention to provide a manually resetting thermostat which may be reset without physically moving the bimetallic member thereof and which cannot be reset until the ambient temperature associated with the bimetallic member has decreased to a satisfactory predetermined value.

A further object of my invention is to provide a manually resetting thermostat which may be readily adjusted to operate at any desired ambient temperature value.

A further object of my invention is to provide an efficient, rigid, compact bimetallic thermostat which will be stable and dependable in operation.

Other objects of my invention will either be pointed out specifically in the course of the following description of a device embodying my invention or will be apparent from such description.

In the accompanying single sheet of drawings,

Figure 1 is a partial plan view of a device embodying my invention,

Figs. 2 and 3 are sectional views taken along the line II—II and the line III—III, respectively, of Fig. 1 with the bimetallic member in the closed or operative position, Fig. 4 is a sectional view similar to Fig. 2, with the bimetallic member in its open or inoperative position, Fig. 5 is a sectional view similar to Fig. 3 embodying a modified form of a guide pin, and Fig. 6 is a partial sectional view similar to Fig. 3 showing the bimetallic member in its restrained position.

In the accompanying drawing, I show a thermostat 11 comprising a base 12, a heat-responsive device 13, a circuit-maker and breaker 14 having one contact member operatively associated with the base 12 and a second contact operatively associated with the heat-responsive member 13, and a latching device 15 which restricts the mating of the contacts.

The base 12 comprises a base member 16, which may have a sheet of insulating material 17 such as mica on both sides in juxtaposition therewith. A collar 18 may be rigidly attached to the base member 16 substantially at the center thereof and may have a suitable regulating shaft 19 rotatably mounted therein.

The heat-responsive device 13 may comprise a bimetallic element 20 which, if in the form of a disc, may be rigidly attached to the regulating shaft 19 at substantially its central point by means of a cap screw 21 or any other suitable device. It is to be understood that the bimetallic heat responsive element 20 may be in any shape or size desired. However, it is preferred that such bimetallic heat-responsive element be of the so-called disc type which will flex from a normal concave position to a reversed or convex position at a predetermined temperature value, and which will return to its normal concave position at a second predetermined temperature value. The temperature at which these operations occur may be easily regulated by longitudinal movement of the shaft 19 which may be accomplished by the rotation of such shaft in the cooperating collar 18.

It is to be understood that the slotted head screws 28, as shown in Fig. 3, may limit the outward flexure of the bimetallic member 20, depending upon the exact position of the slotted head 29 in respect to the bimetallic member 20. If the shaft 19 be rotated to adjust the operating temperature of the bimetallic member 20, while the slotted heads 29 are in a position to limit the outward flexure of such member, both the opening and closing temperature of the bimetallic member will be adjusted a corresponding amount.

If it be desired to have the thermostat close at a constant set temperature value, regardless of the adjustable opening feature, it is merely necessary to remove the slotted head screws 28 and substitute one guide pin 33, as shown in Fig. 4. The guide pin 33 would then merely keep the bimetallic member 20 from rotating while in operation. By removing the restraining action of the slotted heads 29 the bimetallic member 20, when flexed to an open position, will always have the same flexure and, therefore, close at any set value, depending upon the inherent characteristics of such bimetallic member. With the thermostat built in such a manner, it is obvious that the opening temperature value of such thermostat may be regulated by the rotation of shaft 19 without changing the closing value of such thermostat.

The circuit-maker and breaker 14 comprises a plurality of contact members 22 and 30. The movable contact 22 may include a stationary dome-shaped member 22a and a movable bridging contact member 26, and may be insulatedly attached to the bimetallic heat-responsive element 20 in any suitable manner. However, it is preferred that the contact 22 be attached to the bimetallic member by means of a pin 23 which may rigidly attach the dome-shaped member 22a thereto and may movably attach the bridging member upon the dome-shaped member. The pin 23 loosely holds the bridging member 26 upon the dome-shaped member by means of a shoulder or button 24 which is an integral part of the pin 23. The stationary contact 30 may be insulatedly mounted upon the base member 16 in any suitable manner. However, it is preferred that such contact be rigidly attached to the base 12 by means of a pin 31, which may be an integral part of a terminal block 32 insulatedly mounted upon the base 12. By having the bridging contact member 26 mounted loosely upon the dome-shaped member 22a and the stationary contacts 30 rigidly attached to the base 12, the bridging contact member 26 will make positive contact with the stationary contact member 30.

The preferred form of a latching device 15 comprises an irregularly shaped latching block 35 which is slidably mounted upon the base member 16 within a co-operating slot 36. The latching block 35 is biased outwardly by means of a resilient member 37. The latching block 35 may comprise a horizontal portion 38 which may have an extending neck portion 39 which fits into the co-operating slot 36 within the base member 16 when the latching block 35 is not restrained in its travel by the steam 25. An upwardly protruding portion or handle 40 extends above the base 12 and such protruding portion 40 may be used to manually slide the latching block 35 within the slot 36 against the action of the resilient member 37. However, it is to be understood that the latching block 35 may be operated through the handle 40 in any desirable manner, such as by a cam, lever, or electrical solenoid, or any other suitable device.

In operating the bimetallic thermostat embodying my invention with the bimetallic heat-responsive element 20 in a normal concave position, such thermostat has the circuit-maker and breaker thereof in a closed or operative position. With the bimetallic member in the closed position as shown in Fig. 3, a stem 25 extending above the shoulder 24 of pin 23 is located within the slot 36 within which the latch block 15 is operatively associated and restrains the movement of such latch block. With the bimetallic member 20 in the closed position, the bridging contact 26 is operatively associated or mated with the stationary contact 30 and the stem 25 is operatively associated with the latching device 15 as hereinabove described.

As the ambient or operating temperature operatively associated with the bimetallic element 20 arrives at the temperature at which such bimetallic member is set to operate, the member will flex convexly, taking with it the movable contact 22. As the bimetallic element 20 flexes outwardly and away from the base 16, the stem 25 operatively associated with the contact 22 is withdrawn from the slot 36 located in base 16. With the withdrawal of stem 25 from the aperture, the latching block 35 is biased and moved outwardly by means of the resilient member 37, as shown in Fig. 5. The extending neck portion 39 of the latching block 35 then fills the co-operating slot 36 which precludes the entrance of stem 25 therein.

As the ambient temperature returns to the normal value at which the bimetallic element 20 will flex to its normal operating position, such bimetallic element will tend to flex to its normal position. However, the bimetallic element will be restrained in its movements and the contact 22 will be prohibited from mating with the contact 30, due to the action of stem 25 engaging the neck portion 39 of the latching device 15. The stem 25 will, therefore, hold the bimetallic member 20 in an inoperative position prohibiting the mating of the contacts, as shown in Fig. 6, until the restraining action of the latching device 15 has been removed.

To reset the thermostat it becomes necessary to remove the restraining action of the latching device 15. To move the latching device it is necessary to apply a force to the protruding portion or handle 40 of the latching block 35 in a direction opposite to that applied by the resilient member 37. As the latching block is moved away from the stem 25, the stem 25 will be permitted to enter the slot located within the base 16. Due to the action of the potential energy of the restrained bimetallic element 20 endeavoring to return to its normal operative position, the stem 25 will be instantly snapped into the opening left by the latching block, as such block is manually moved away from its restraining position. As the stem 25 moves within the slot, the bimetallic element 20 will return to its normal operative position, and the bridging contact 26 will mate with the stationary contacts 30, closing the circuit associated therewith, as shown in Fig. 3.

It is to be understood that the latching device 15 may be in any shape desired and that such device may comprise any number of parts desired, such as the combination of a latch block and resilient member, as hereinabove described, or a single resilient member which in itself would be the latching device, and that such device will operate equally well with either a strip or a disc type thermostat which may or may not be adjustably operated.

It is, therefore, obvious that the device embodied in my invention provides a manually resetting bimetallic thermostat, which does not move the bimetallic element to reset the device, and which can only be reset after the ambient temperature has returned to a normal preset value.

Various modifications may be made in the device embodying my invention without departing from the spirit and scope thereof, and I desire, therefore, that only such limitations shall be placed thereon as are imposed by the prior art and the appended claims.

I claim as my invention:

1. In a thermostat, a base, a heat-responsive member, a circuit-maker and breaker comprising a stationary contact insulatedly mounted upon said base and a cooperating movable contact insulatedly mounted upon said heat-responsive member, said movable contact having a stem movable therewith, and means including said stem for restricting the mating of said contacts.

2. In a thermostat, a base, a heat-responsive member, a circuit-maker and breaker comprising a stationary contact insulatedly mounted upon said base and a cooperating movable contact insulatedly mounted upon said heat-responsive member, said movable contact having a stem movable therewith, a latch-block operatively associated with the base, and means comprising said stem and said latch-block for restricting the mating of said contacts.

3. In a thermostat, a base, a heat-responsive member, a circuit-maker and breaker comprising a stationary contact insulatedly mounted upon said base and a cooperating movable contact insulatedly mounted upon said heat-responsive member, said movable contact having a stem movable therewith, a latch-block slidably mounted upon said base, means for biasing said latch-block, and means comprising said stem and said latch-block for restricting the mating of said contacts.

4. In a thermostat, a base, a heat-responsive member, a circuit-maker and breaker comprising a stationary contact insulatedly mounted upon said base and a cooperating movable contact insulatedly mounted upon said heat-responsive member, said movable contact having a stem movable therewith, a latch-block slidably mounted upon said base, said latch-block having a protruding portion extending above the base, means for biasing said latch-block, means comprising said stem and said latch-block for restricting the mating of said contacts, and means comprising said protruding portion for sliding said latch-block against the action of the biasing means for permitting the mating of said contacts.

PAUL R. LEE.